(12) United States Patent
Lee et al.

(10) Patent No.: US 12,185,098 B2
(45) Date of Patent: Dec. 31, 2024

(54) VEHICLE, COMMUNICATION SYSTEM AND COMMUNICATION METHOD USING THE SAME

(71) Applicant: SAMSUNG ELECTRONICS CO., LTD., Suwon-si (KR)

(72) Inventors: Jun Ho Lee, Hwaseong-si (KR); Jang-Won Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/448,474

(22) Filed: Aug. 11, 2023

(65) Prior Publication Data

US 2023/0396995 A1  Dec. 7, 2023

Related U.S. Application Data

(63) Continuation of application No. 17/011,337, filed on Sep. 3, 2020, now abandoned.

(30) Foreign Application Priority Data

Jan. 3, 2020  (KR) ........................ 10-2020-0000759

(51) Int. Cl.
*H04M 1/66* (2006.01)
*G06F 16/23* (2019.01)
(Continued)

(52) U.S. Cl.
CPC ........ *H04W 12/02* (2013.01); *G06F 16/2379* (2019.01); *H04L 9/0869* (2013.01);
(Continued)

(58) Field of Classification Search
CPC ..... H04W 12/02; H04W 4/44; H04W 12/033; H04W 12/069; H04W 12/75;
(Continued)

(56) References Cited

U.S. PATENT DOCUMENTS

| | | |
|---|---|---|
| 5,864,667 A | 1/1999 | Barkan |
| 7,543,139 B2 | 6/2009 | Camenisch et al. |

(Continued)

FOREIGN PATENT DOCUMENTS

| | | |
|---|---|---|
| KR | 10-2011-0043535 | 4/2011 |
| KR | 10-2019-0104475 | 9/2019 |
| KR | 10-2021567 | 9/2019 |

OTHER PUBLICATIONS

Lei, et al., "Blockchain-Based Dynamic Key Management for Heterogeneous Intelligent Transportation Systems", IEEE Internet of Things Journal, vol. 4, No. 6, Dec. 2017, pp. 1832-1843.
(Continued)

*Primary Examiner* — Stephen M D Agosta
(74) *Attorney, Agent, or Firm* — F. CHAU & ASSOCIATES, LLC

(57) ABSTRACT

The present disclosure provides a communication method comprising registering a public key for a vehicle, generating a pseudonym ID, transmitting the pseudonym ID, verifying whether the vehicle is registered, and storing a first transaction. Registration of the public key for the vehicle comprises receiving a service with a service provider. The pseudonym ID is generated based on the public key. The pseudonym ID and vehicle data are transmitted to a road side unit. Verification as to whether the vehicle is registered with the service provider is performed based on the transmitted pseudonym ID. A transaction including the pseudonym ID and the vehicle data is then stored in a database of the service provider according to a result of the verification.

18 Claims, 12 Drawing Sheets

(51) Int. Cl.
  *H04L 9/08* (2006.01)
  *H04L 9/30* (2006.01)
  *H04M 1/68* (2006.01)
  *H04M 3/16* (2006.01)
  *H04W 4/44* (2018.01)
  *H04W 12/02* (2009.01)
  *H04W 12/033* (2021.01)

(52) U.S. Cl.
  CPC .............. *H04L 9/30* (2013.01); *H04L 9/3066* (2013.01); *H04W 4/44* (2018.02); *H04W 12/033* (2021.01)

(58) Field of Classification Search
  CPC ....... H04L 9/0869; H04L 9/30; H04L 9/3066; H04L 9/3239; H04L 9/50; H04L 2209/42; H04L 2209/80; H04L 2209/84; H04L 9/0825; H04L 63/0421; G06F 16/2379
  See application file for complete search history.

(56) References Cited

U.S. PATENT DOCUMENTS

| | | | |
|---|---|---|---|
| 7,962,761 B1 * | 6/2011 | Spalka ................. | H04L 9/0866 726/28 |
| 9,288,048 B2 | 3/2016 | Han et al. | |
| 10,284,654 B2 | 5/2019 | Alvarez et al. | |
| 11,424,941 B2 | 8/2022 | Russell et al. | |
| 2003/0028493 A1 * | 2/2003 | Tajima ............... | G06Q 20/3674 705/67 |
| 2003/0115457 A1 | 6/2003 | Wildish et al. | |
| 2004/0030932 A1 | 2/2004 | Juels et al. | |
| 2004/0083182 A1 | 4/2004 | Moribatake et al. | |
| 2007/0101138 A1 | 5/2007 | Camenisch | |
| 2008/0232595 A1 | 9/2008 | Pietrowicz et al. | |
| 2009/0182673 A1 | 7/2009 | Al-Herz et al. | |
| 2009/0260057 A1 | 10/2009 | Laberteaux et al. | |
| 2010/0020975 A1 | 1/2010 | Bissett | |
| 2010/0031025 A1 | 2/2010 | Zhang et al. | |
| 2010/0169218 A1 | 7/2010 | Wang et al. | |
| 2011/0154055 A1 * | 6/2011 | Spalka ................. | H04L 9/3066 713/189 |
| 2011/0225114 A1 * | 9/2011 | Gotthardt ............... | G16H 10/20 706/50 |
| 2014/0020098 A1 | 1/2014 | Stählin | |
| 2015/0139421 A1 | 5/2015 | Cordeiro De Oliveira Barros et al. | |
| 2015/0271668 A1 * | 9/2015 | Sun ...................... | H04W 12/04 455/411 |
| 2015/0277846 A1 | 10/2015 | Yen et al. | |
| 2017/0111353 A1 * | 4/2017 | Tschache ............... | H04L 9/006 |
| 2017/0195833 A1 | 7/2017 | Chami et al. | |
| 2017/0195883 A1 | 7/2017 | Kwok et al. | |
| 2018/0048738 A1 | 2/2018 | Hinds | |
| 2018/0137261 A1 | 5/2018 | Lattin et al. | |
| 2018/0316511 A1 * | 11/2018 | Meyer ................ | G06F 9/45558 |
| 2018/0345810 A1 * | 12/2018 | Shuaib ................... | B60L 53/63 |
| 2019/0066402 A1 | 2/2019 | Unagami et al. | |
| 2019/0089539 A1 * | 3/2019 | Dupont .............. | G06V 40/1306 |
| 2019/0089547 A1 * | 3/2019 | Simplicio, Jr. ..... | H04L 63/0823 |
| 2019/0123915 A1 * | 4/2019 | Simplicio, Jr. ........ | H04L 67/12 |
| 2019/0138007 A1 * | 5/2019 | Baghsorkhi ............. | G08G 1/16 |
| 2019/0149598 A1 | 5/2019 | Sawada et al. | |
| 2019/0158297 A1 | 5/2019 | Yabuuchi | |
| 2019/0215165 A1 * | 7/2019 | Simplicio, Jr. ........ | H04L 9/0894 |
| 2019/0245703 A1 * | 8/2019 | Simplicio Junior, Jr. ................... | H04L 9/3268 |
| 2019/0251199 A1 | 8/2019 | Klianev | |
| 2019/0256088 A1 * | 8/2019 | Sharma ................ | G06V 10/764 |
| 2019/0266897 A1 | 8/2019 | Turato | |
| 2019/0287318 A1 | 9/2019 | Fukuhara et al. | |
| 2019/0303557 A1 | 10/2019 | Ando | |
| 2019/0335304 A1 | 10/2019 | Yabuuchi | |
| 2020/0090208 A1 * | 3/2020 | Reichenbach ......... | G06Q 40/08 |
| 2020/0220737 A1 * | 7/2020 | Ryu ...................... | B60R 21/013 |
| 2020/0322135 A1 | 10/2020 | Kupwade et al. | |
| 2021/0211869 A1 | 7/2021 | Lee et al. | |
| 2022/0386076 A1 * | 12/2022 | Lopatin .................. | H04W 4/06 |

OTHER PUBLICATIONS

Li, et al., "CreditCoin: A Privacy-Preserving Blockchain-Based Incentive Announcement Network for Communications of Smart Vehicles", IEEE Transactions on Intelligent Transportation Systems, pp. 1-17.

Lu, et al., "A Privacy-Preserving Trust Model Based on Blockchain for VANETs", Digial Object Identifier 10.1109/ACCESS.2018. 286489, vol. 2, 2018, pp. 45655-45664.

Yang, et al., "Blockchain-based Decentralized Trust Management in Vehicular Networks", IEEE Internet of Things Journal, 2018, 10 pages.

Zhang, et al., "A Privacy-Preserving Traffic Monitoring Scheme via Vehicular Crowdsourcing", Sensors 2019, 19, 1274; doi:10.3390/s19061274; pp. 1-15.

Zhang, et al., "Onionchain: Towards Balancing Privacy and Traceability of Blockchain-Based Applications", Journal of Latex Class, Files, vol. 14, No. 8, Aug. 2019, pp. 1-13.

* cited by examiner

VEHICLE, COMMUNICATION SYSTEM AND COMMUNICATION METHOD USING THE SAME

CROSS-REFERENCE TO RELATED APPLICATION

This application claims priority under 35 U.S.C. 119 from Korean Patent Application No. 10-2020-0000759 filed on Jan. 3, 2020 in the Korean Intellectual Property Office and claims benefit under 35 U.S.C. 120 from U.S. patent application Ser. No. 17/011,337 filed on Sep. 3, 2020 in the US Patent and Trademark Office, the contents of which are incorporated by reference in their entirety.

BACKGROUND

1. Technical Field

The present disclosure relates to a vehicle, a communication system and a communication method using the same.

2. Description of the Related Art

Mobile communication technology enables information to be shared between a wireless device and a land-based communication station. Fifth generation (5G) networking is a technology standard for mobile communication networks. Information from smartphones, aircraft, and automobiles may be accessed through 5G networks.

Automobiles are an example of a system that can utilize 5G communications. Automobile information may contain data such as traffic volume, road conditions, or vehicle motion data. This data may be collected and analyzed in by a service provider in real time to optimize traffic flow, provide emergency support, or provide vehicle location information (e.g., for navigation or law enforcement purposes).

When service provider collects vehicle information, the anonymity of a user may be compromised. Thus, in many cases user privacy cannot be guaranteed or protected. An anonymous ID could be used to increase privacy, but this may prevent the identity of the user's vehicle from being verified. As a result, the user may not be able to collect or monitor information about their vehicle.

Therefore, there is a need in the art for acquiring vehicle data capable of verifying the identity of the vehicle while ensuring the user's privacy. This could enable users to monitor the information about their vehicle without compromising privacy.

SUMMARY

Aspects of the present disclosure provide a communication method capable of verifying an identity of a vehicle while ensuring privacy of the vehicle.

Aspects of the present disclosure also provide a communication method capable of publicly managing vehicle data to prevent a service provider from denying a fact that a vehicle has provided the vehicle data to the service provider. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a communication method comprising registering a public key for a vehicle which receives a service from a service provider; generating a pseudonym ID corresponding to the public key; transmitting the pseudonym ID and vehicle data; verifying whether the vehicle is registered with the service provider based on the transmitted pseudonym ID; and storing a first transaction including the pseudonym ID and the vehicle data in a database of the service provider according to a result of the verification.

According to another aspect of the present disclosure, there is provided a communication system comprising a wireless communication module configured to receive a pseudonym ID and vehicle data from a vehicle; a network communication module configured to transmit the pseudonym ID and the vehicle data to a service provider providing a service, and to receive an initial secret value for the service; a base station arithmetic unit configured to verify whether the vehicle is registered for the service through the received initial secret value; and a first base station server configured to form a blockchain transaction including the pseudonym ID and the vehicle data according to a verification result of the base station arithmetic unit, and to store the blockchain transaction.

According to another aspect of the present disclosure, there is provided a vehicle comprising a sensor configured to acquire vehicle data; a security module configured to store a private key, the security module comprising a random number generator configured to generate a plurality of first random numbers that vary over time; a wireless communication module configured to receive a public key generated by an operation of the private key and to receive an initial secret value provided by a service provider; and a vehicle arithmetic unit configured to generate a pseudonym ID based on the public key, wherein the wireless communication module is further configured to transmit the pseudonym ID to verify that the pseudonym ID is generated based on the initial secret value.

According to another aspect of the present disclosure, there is provided a method of communication comprising receiving an initial secret value from a service provider; receiving a pseudonym ID and vehicle data from a vehicle; verifying that the vehicle is registered with the service provider based on the pseudonym ID and the initial secret value; and storing a transaction comprising the pseudonym ID and vehicle data based on the verification.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

The present disclosure relates to mobile communications between an automobile and a communication network. Embodiments of the present disclosure relate to a method for verifying the identity of a vehicle without comprising the privacy of a user.

As new mobile communications technology becomes commercially available, there is an increasing need for obtaining a large amount of data from communication devices. For example, service providers who provide a services to vehicle users have attempted to acquire vehicle data such as a traffic volume, road conditions, the occurrence of natural disasters, and the like from vehicles that receive the service. In some cases, these service provides immediately analyze the vehicle data for use in providing the service.

When a service provider acquires the vehicle data a user's may not be protected. For example, ins some cases a travel route of the vehicle can be tracked through the data transmitted from the vehicle. However, when an anonymous ID is used to protect the privacy, the identity of the vehicle which generated data may not be verifiable. This may make it difficult to provide the user with a reward or incentive for providing the data. In other words, there can be a trade-off between the privacy and the identification of the vehicle. Embodiments of the present disclosure provide a method for enabling vehicle identification that does not compromise the privacy of a user.

According to one embodiment, a method of communication includes registering a public key for a vehicle, generating a pseudonym ID, transmitting the pseudonym ID, verifying whether the vehicle is registered, and storing a first transaction. Registration of a public key for a vehicle may include comprises receiving a service from a service provider. Generation of the pseudonym ID may be based on the registered public key. The pseudonym ID and vehicle data may then be transmitted, and verification of whether the vehicle is registered with the service provider through the transmitted pseudonym ID may be performed. In some cases, a transaction, including the pseudonym ID and the vehicle data, is stored in a database of the service provider according to a result of the verification.

Embodiments of the present disclosure provide data from a vehicle to a road side unit. The road side unit may contain a server and may use blockchain technology to perform calculations on the data. The calculations may be provided to a core network, which can be accessed by a service provider. Data may then be provided back to the vehicle, where a user may decipher the data.

Hereinafter, exemplary embodiments of the present inventive concept will be described with reference to the accompanying drawings.

Figure 1:
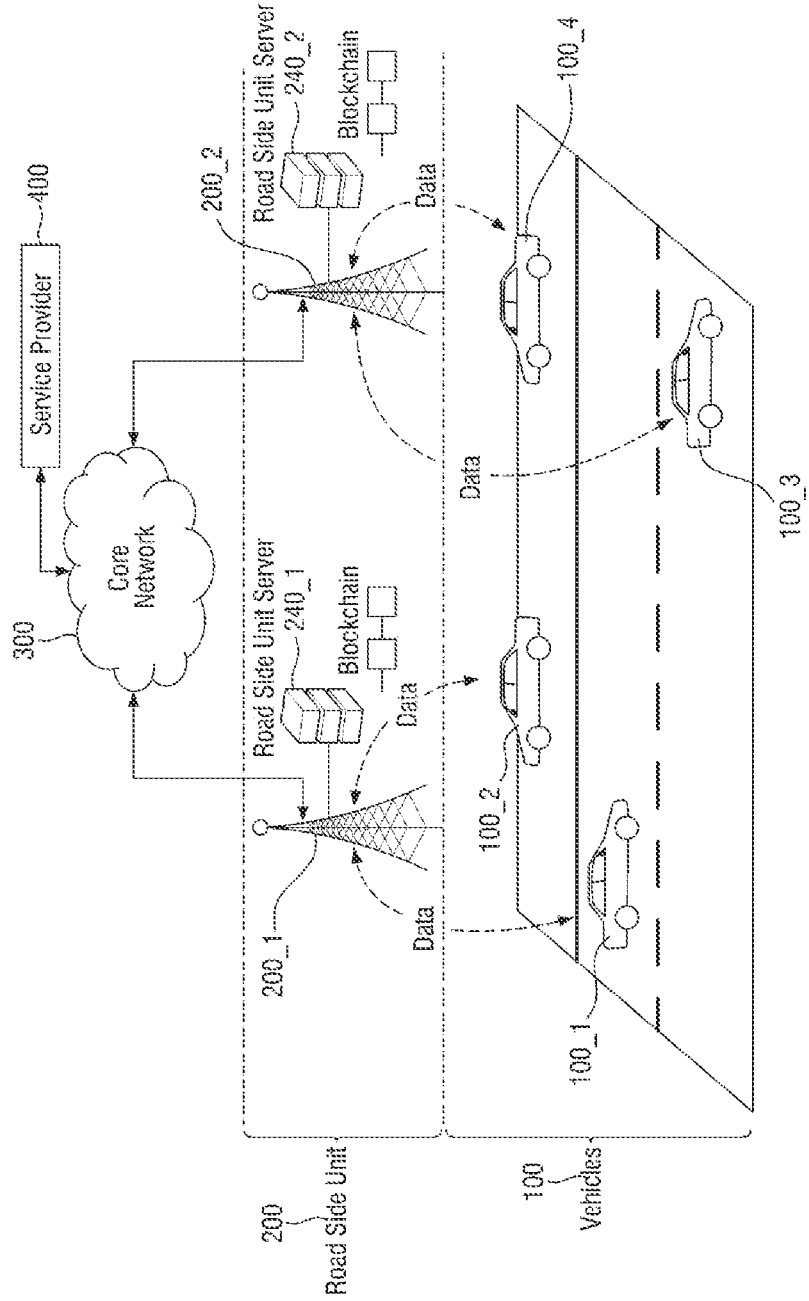
FIG. 1 is a diagram illustrating a structure of a communication system according to some embodiments.
Figure 2:
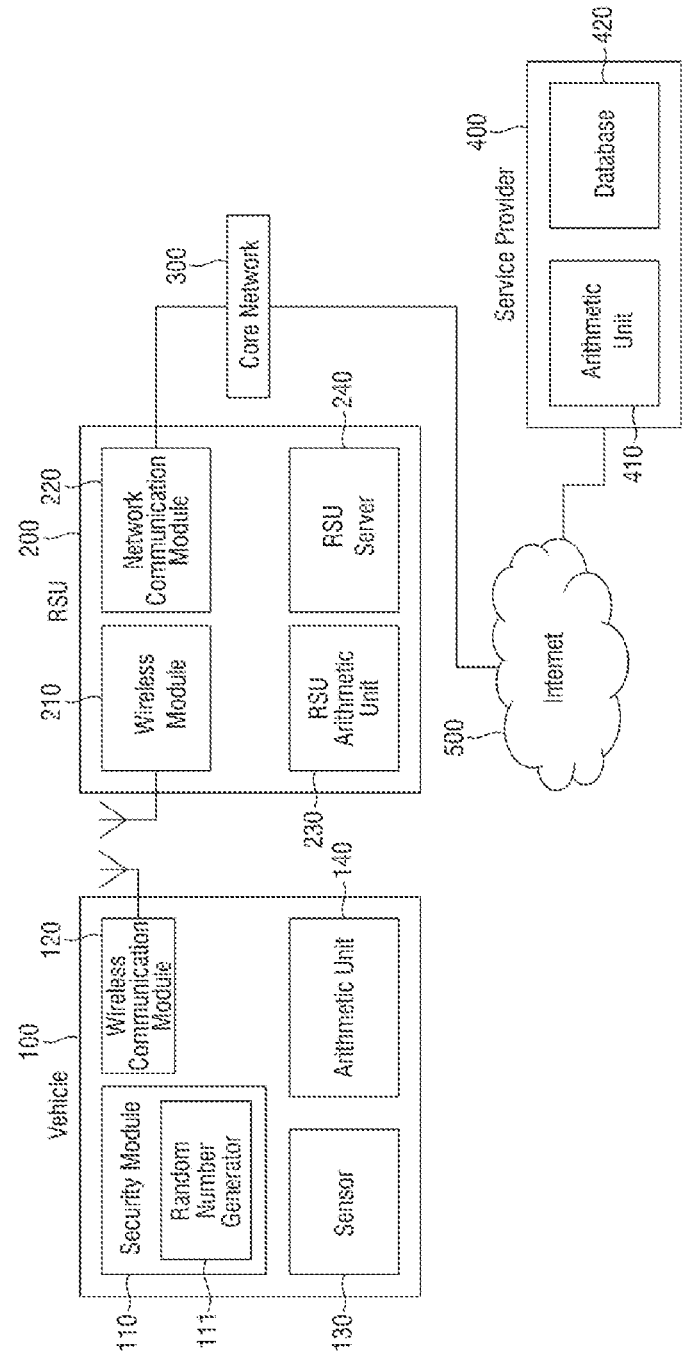
FIG. 2 is a block diagram illustrating the communication system according to some embodiments.

FIG. 1 is a diagram illustrating a structure of a communication system according to some embodiments. FIG. 2 is a block diagram illustrating the communication system according to some embodiments.

The communication system, according to some embodiments, may be a fifth generation (5G) communication system, or a pre-5G communication system such as a fourth generation (4G) communication system.

For example, the 5G communication system may be implemented in an ultra-high frequency (millimeter wave) band (e.g., 60 GHz band). Techniques such as beam-forming, multiple input multiple output (MIMO), full dimensional MIMO (FD-MIMO), array antenna techniques, analog beam-forming, and large scale antenna techniques may be applied in the communication system to reduce propagation loss of radio waves and increase the transmission distance thereof.

The communication system, according to some embodiments, may include a plurality of vehicles 100. The vehicles 100 may include first to fourth vehicles 100_1 to 100_4, a plurality of roadside units 200 including first and second roadside units 200_1 and 200_2, a core network 300, a service provider 400, and the Internet 500.

The first roadside unit 200_1 may communicate with the first and second vehicles 100_1 and 100_2 to transmit and receive data. The second roadside unit 200_2 may communicate with the third and fourth vehicles 100_3 and 100_4 to transmit and receive data.

The first and second roadside units 200_1 and 200_2 include first and second roadside unit servers 240_1 and 240_2, respectively. Each of the first and second roadside unit servers 240_1 and 240_2 may be components of a blockchain network. The formation of the blockchain network will be described later.

The first and second roadside units 200_1 and 200_2 may communicate with the core network 300. Communication with the core network 300 may be used to communicate with a service provider 400. For example, the first through fourth vehicles 100_1 to 100_4, the roadside units 200_1 and 200_2, and the service provider 400 may be connected to, and communicate through, the Internet 500.

The vehicle 100, according to some embodiments, may have a mobile communications capability. The vehicle 100 may also represent or be referred to by a term such as a terminal, a user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device and a device-to-device (D2D) device or the like.

The vehicle 100, according to some embodiments, may include a security module 110, a wireless communication module 120, a sensor 130, and an arithmetic unit 140. In the present disclosure, the vehicle 100 is used as an example of a transport device, but the present disclosure is not limited thereto. The vehicle 100 may be another communication device or another transport device such as a train, a ship or the like.

The security module 110 may perform operations to execute a cryptographic protocol, securely store sensitive information such as a cryptographic secret key, and provide hardware (H/W) security. The security module 110 may include a random number generator 111 for generating a random number, where the random number varies over time. The security module 110 may be a hardware security module (HSM), a subscriber identification module (SIM), an embedded secure element (eSE), or the like.

The security module 110 may support a security-related library with, for example, an elliptic curve cryptography (ECC) public key or a Rivest-Shamir-Adleman (RSA) public key. In the present disclosure, the ECC will be described below as an example, but the present disclosure is not limited thereto.

In some embodiments, the security module 110 may store a private key $(x_i)$, a public key $(Q_i)$, and an initial secret value (s), which will be described later. Once stored, the private key $(x_i)$, the public key $(Q_i)$, and the initial secret value (s) are not exposed outside the security module 110. The private key $(x_i)$, the public key $(Q_i)$, and the initial secret value (s) may be issued by a trusted third party. The security module 110 may further store another public key $(Q_{i,\,s})$.

The wireless communication module 120 may perform functions for transmitting and receiving signals through a radio frequency channel. For example, the wireless communication module 120 may perform a conversion function between a baseband signal and a bit string according to a physical layer standard of the system. When transmitting data, the wireless communication module 120 encodes and modulates the bit string to be transmitted to generate complex symbols. When receiving data, the wireless communication module 120 demodulates and decodes the received baseband signal to restore the bit string.

The wireless communication module 120 up-converts the baseband signal into a radio frequency (RF) band signal to transmit the signal through an antenna. Additionally or alternatively, the wireless communication module 120 down-converts the RF band signal received through the antenna into the baseband signal. In some examples, the wireless communication module 120 may include a transmission filter, a reception filter, an amplifier, a mixer, an oscillator, a digital to analog convertor (DAC), an analog to digital convertor (ADC), and the like.

The wireless communication module 120 may further include a plurality of transmission/reception paths. The wireless communication module 120 may further include at least one antenna array configured with a plurality of antenna elements. The wireless communication module 120 may be configured with a digital circuit and an analog circuit (e.g., a radio frequency integrated circuit (RFIC)). In some cases, the digital circuit and the analog circuit may be implemented in one package. The wireless communication module 120 may further include a plurality of RF chains. Additionally or alternatively, the wireless communication module 120 may perform beam-forming.

Further, the wireless communication module 120 may include different communication modules to process signals of different frequency bands. Furthermore, the wireless communication module 120 may include a plurality of communication modules to support different wireless access techniques. For example, the different wireless access techniques may include Bluetooth low energy (BLE), wireless fidelity (Wi-Fi), WiFi Gigabyte (WiGig), a cellular network (e.g., long term evolution (LTE)), and the like. Further, the different frequency bands may include a super-high frequency (SHF) (e.g., 2.5 GHz, 5 GHz, or the like) band and a millimeter-wave (e.g., 60 GHz) band.

The wireless communication module 120 transmits and receives signals, as described above. Accordingly, in the following description, the transmission and reception performed through the radio frequency channel are considered to include the above-described processing performed by the wireless communication module 120.

The sensor 130 may be, e.g., a smartphone, a sensor for detecting internal information of the vehicle, a black box for imaging conditions of a road where the vehicle travels in real-time, or the like. In some examples, the sensor 130 may image the front and rear regions of the road where the vehicle travels in real-time to detect objects such as vehicles, road conditions, and the like from the captured image data by applying an object detection algorithm. Thereafter, the sensor 130 may provide at least one among type information, location information, and movement information of the detected object.

The arithmetic unit 140 may include various kinds of hardware (or processor) accelerators or software. For example, the arithmetic unit 140 may include a hardware accelerator such as a central processing unit (CPU), a graphics processing unit (GPU), or the like. Operations such as add, multiplication, shift, XOR, AND, OR, NOR, and NAND may be performed in the hardware, as well as operations for processing RSA and ECC public keys, such as modular operations of modular addition, modular multiplication and the like.

The roadside unit 200, according to some embodiments, may be a terminal node of a network that directly communicates with the vehicle 100. In the present disclosure, operations described as performed by the roadside unit may be performed by an upper node of the roadside unit in some cases. Additionally or alternatively, in a network configured with a plurality of network nodes including a roadside unit, various operations performed for communications with a terminal may be performed by the roadside unit or other network nodes. According to various embodiments, the roadside unit (RSU) may be a fixed station, a base station (BS), a Node B, an evolved-NodeB (eNB), a base transceiver system (BTS), an access point (AP), a macro eNB (MeNB), a secondary eNB (SeNB), or the like.

The RSU 200, according to some embodiments, may include a wireless module 210, a network communication module 220, an RSU arithmetic unit 230, and an RSU server 240.

The wireless module 210 may have the same or similar functions and configurations as the wireless communication module 120 of the vehicle 100. The description for the wireless module 210 of the RSU 200 may also apply to the wireless communication module 120 of the vehicle 100.

The network communication module 220 transmits data to the core network 300, through wired or wireless communications, to transmit data to the service provider 400. According to some embodiments, the network communication module 220 is a unit in charge of connecting to the core network 300 in the RSU 200.

The RSU arithmetic unit 230 may include various kinds of hardware (or processor) accelerators or software. For example, the RSU arithmetic unit 230 may include a hardware accelerator such as a central processing unit (CPU), a graphics processing unit (GPU), or the like. Operations such as add, multiplication, shift, XOR, AND, OR, NOR, and NAND may be performed in the hardware. Additionally or alternatively, operations for RSA and ECC public keys, such as modular operations of modular addition, modular multiplication, and the like, may be performed in the hardware.

The RSU server 240 may process data using mobile edge computing techniques. The mobile edge computing may be applied in a fourth generation (4G) or fifth generation (5G) environments, but the present disclosure is not limited thereto. In the mobile edge computing, a service may be provided to the vehicle 100 by performing computing at the RSU 200 as one edge. The RSU server 240, according to some embodiments, may store the initial secret value (s), a pseudonym ID $(PID_i)$, and vehicle data (m), which will be described later.

The RSU server 240 may perform functions of a blockchain node. The blockchain node refers to a computing node capable of forming a blockchain network and maintaining and managing blockchain data based on a blockchain algorithm/protocol. The computing node may be implemented with a physical computing device or a logical computing device, such as a virtual machine. In some cases, a plurality of blockchain nodes may be included in one physical computing device.

The core network 300, according to some embodiments, may provide large-capacity, long-distance voice and data services. The core network 300 is connected to the RSUs 200 and may process user data received through an access network (e.g., to transmit the data to a user of another access network or another communication network). The core network 300 may be connected to the Internet 500, or the like, to transmit/receive data to/from the service provider 400, and provide additional services to users. The core network 300 may include a public switched telephone network (PSTN), an integrated service digital network (ISDN), a wide area network (WAN), a local area network (LAN), and the like, but the present disclosure is not limited thereto.

The service provider 400, according to some embodiments, may include an arithmetic unit 410 and a database 420.

The arithmetic unit 410 of the service provider 400, according to some embodiments, may include various kinds of hardware (or processor) accelerators or software. For example, the arithmetic unit 410 may include a hardware accelerator such as a central processing unit (CPU), a graphics processing unit (GPU) or the like. Operations such as add, multiplication, shift, XOR, AND, OR, NOR, and NAND may be performed in the hardware, as well as operations for RSA and ECC public keys, such as modular operations of modular addition, modular multiplication and the like.

As will be described later, the database 420 may store the pseudonym ID ($PID_i$) and the vehicle data (m) transmitted from the vehicles 100. Additionally or alternatively, the database 420 may share the pseudonym ID ($PID_i$) and the vehicle data (m) stored in the RSU server 240.

According to some embodiments, a method of communication includes receiving an initial secret value from a service provider; receiving a pseudonym ID and vehicle data from a vehicle; verifying that the vehicle is registered with the service provider based on the pseudonym ID and the initial secret value; and storing a transaction comprising the pseudonym ID and vehicle data based on the verification.

In some examples, the transaction is stored in a block of a blockchain. In some examples, the pseudonym ID is generated based on a random number generated and a public key, and wherein the public key is generated based on the initial secret value.

Figure 3:
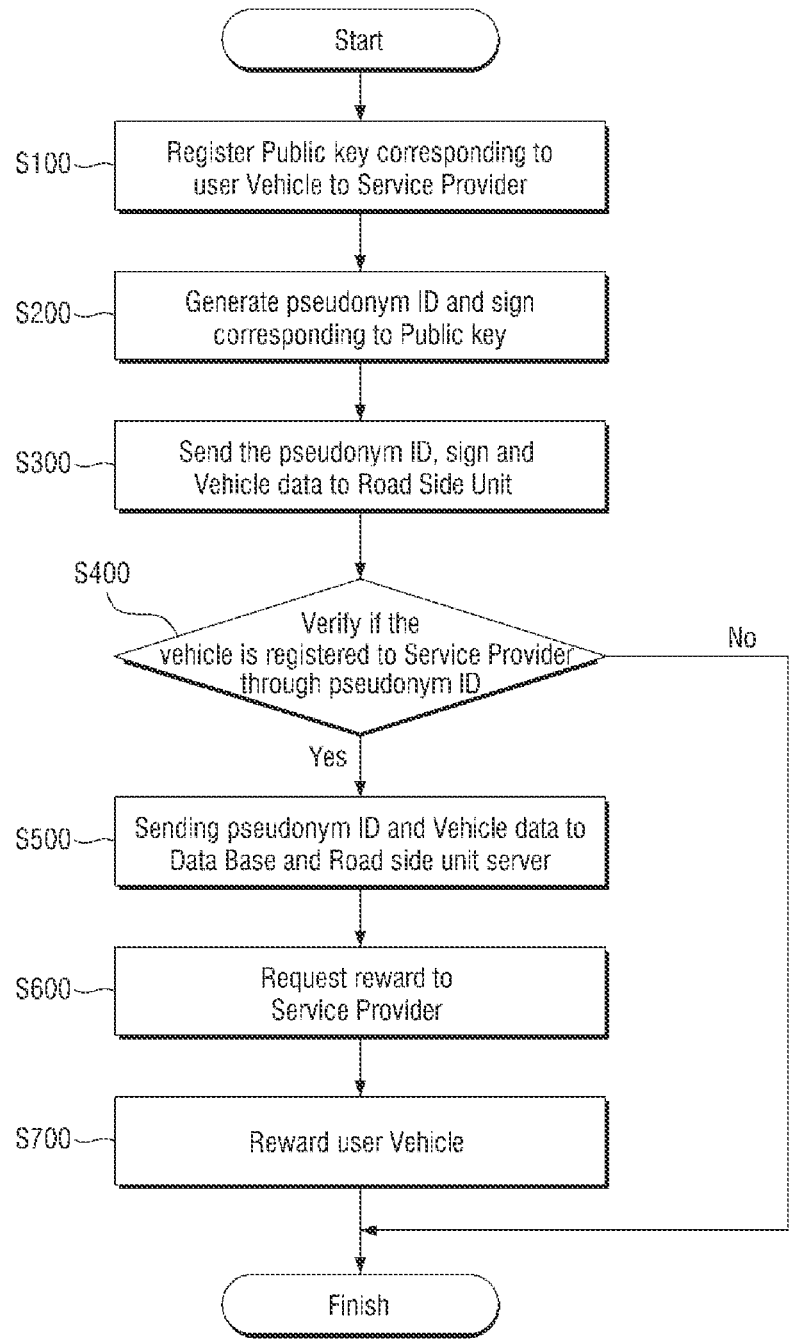
FIG. 3 is a flowchart illustrating a communication method of the communication system according to some embodiments.

FIG. 3 is a flowchart illustrating a communication method of the communication system according to some embodiments.

The vehicle 100 registers a user specific public key ($Q_{i,s}$), which corresponds to the vehicle 100, with the service provider 400 (step S100). In the registration step S100, a process between the service provider 400 and the RSU 200 and a process between the vehicle 100 and the service provider 400 may be performed through a secure channel such as a secure sockets layer (SSL) or a transport layer security (TLS), or performed offline. The registration step may include steps described below.

Figure 4:
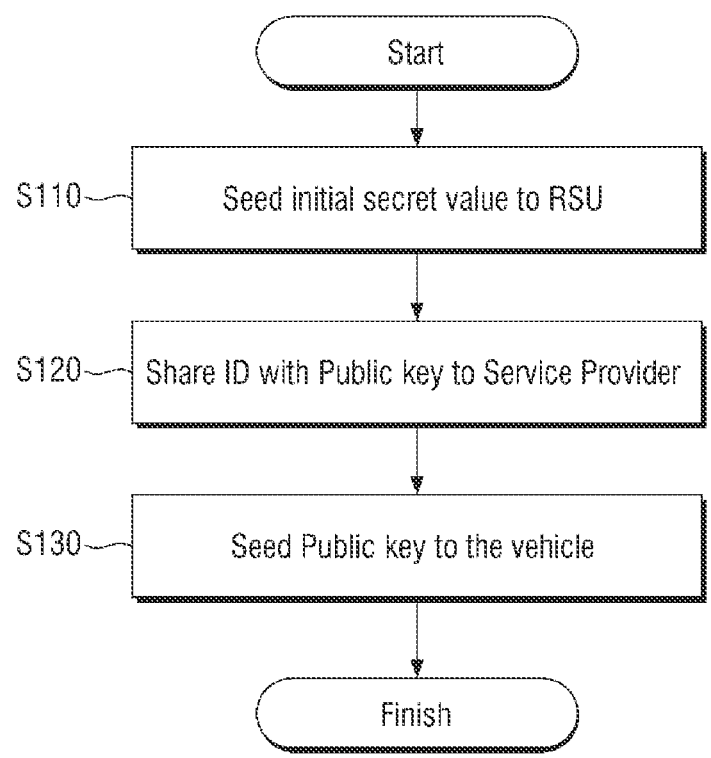
FIGS. 4 and 5 are diagrams explaining step S100 of FIG. 3.
Figure 5:
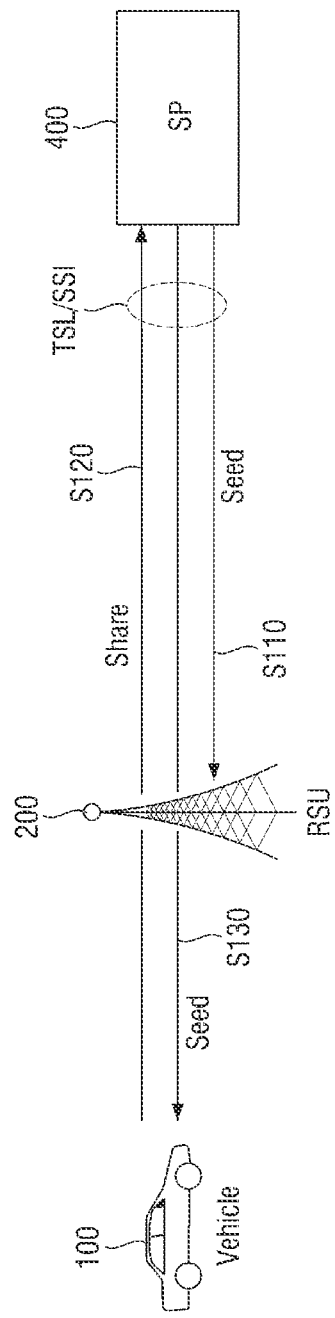

FIGS. 4 and 5 are diagrams explaining the step S100 of FIG. 3. Referring to FIGS. 4 and 5 together, the service provider 400 may provide the initial secret value (s) to the RSU 200 (step S110). The initial secret value (s) is an integer of a set of integers Zn* (Zn*={1, 2, ..., n−1}, n is described later). The initial secret value (s) may be used to determine whether the vehicle 100 has or has not been registered with the service provider 400 for a service.

The vehicle 100 may share the public key ($Q_i$) and a user ID ($ID_i$) with the service provider 400 (step S120). The security module 110 generates the private key ($x_i$) of the vehicle 100 through the random number generator 111. The private key ($x_i$) is an integer of the set of integers Zn* (Zn*={1, 2, ..., n−1}). Each private key ($x_i$) may correspond to a vehicle 100. The service provider may provide the public key ($Q_i$) with the vehicle 100 (S130).

The security module 110 generates the public key ($Q_i$) through the arithmetic unit 140 using Eq. 1 below and the private key ($x_i$) may not be opened to other components during the operation of generating the public key ($Q_i$).

$$Q_i = x_i G \qquad \text{Eq. 1}$$

In the following, $x_i G$ means a value obtained by adding G $x_i$ times and G is an arbitrary point on an elliptic curve according to some embodiments. Further, nG=∞ (point at infinity) is satisfied, and n is less than p (p is described later).

Figure 6:
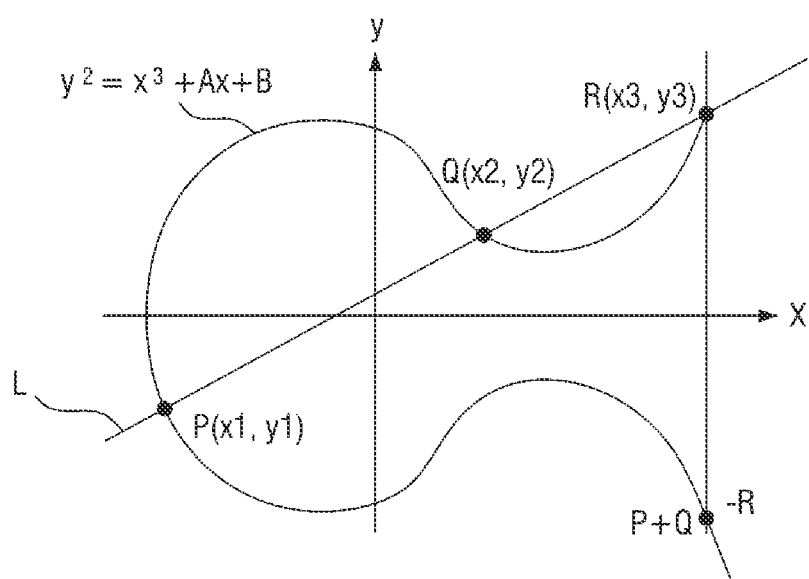
FIG. 6 illustrates elliptic curve cryptography used in the communication method according to some embodiments.

FIG. 6 illustrates elliptic curve cryptography used in the communication method according to some embodiments.

Referring to FIG. 6, $y^2 = x^3 + Ax + B$ is an example of an elliptic curve equation used in the elliptic curve cryptography. A and B are predetermined coefficients used in the elliptic curve equation.

An elliptic curve cryptography (E) corresponding to the elliptic curve equation of FIG. 6 is defined in the Galois field (GFp). GFp={(x, y)|0≤x≤p−1, 0≤y≤p−1}, where x and y are integers, is established.

Accordingly, an elliptic curve digital signature algorithm (ECDSA) related to a signature operation and the elliptic curve cryptography of the communication system, according to some embodiments, may be operated based on $y^2 = x^3 + Ax + B \pmod{p}$.

Given two points of P and Q (P=(x1, y1) and Q=(x2, y2)), the sum of P and Q (P+Q) is defined as follows. When a straight line L connecting the two points P and Q on the elliptic curve meets the elliptic curve at another point R (R=(x3, y3)), P+Q=−R=(x3, −y3) is established (R and P+Q are points symmetric about the x-axis). For example, the sum of the two points on the elliptic curve is defined geometrically.

In other words, the sum of the two points is the x-axis symmetry point of the point at which the straight line connecting the two points and the curve meet. −P represents the x-axis symmetry point of P. In case of P=(x1, y1), −P=(x1, −y1) is established. Further, P+(−P)=∞ (point at infinity) is established.

For the point at infinity ∞, the point is defined that a straight line passing through the point at infinity ∞ is parallel to the y-axis. For example, when the line L is parallel to the y-axis and does not meet another point, the point R is defined as the point at infinity ∞, the point at infinity ∞ is the identity element, and the point symmetric about the x-axis is the inverse element.

The service provider 400 provides the public key ($Q_i$) to vehicle 100 (step S130). The arithmetic unit 410 of the service provider 400 may calculate, as represented in Eq. 2 below, the initial secret value (s) with the public key ($Q_i$) received at the sharing step S120. The arithmetic unit 410 may select a first random value ($r_i$) in the set of integers Zn* (Zn*={1, 2, ..., n−1}) and calculate the first random value ($r_i$) with the initial secret value (s) as represented in Eq. 3 below to generate $y_i$. The arithmetic unit 410 may store the user ID ($ID_i$), the first random value ($r_i$), and the public key ($Q_i$) in the database 420 and provide $y_i$ and the public key ($Q_i$) to the security module 110 of the vehicle 100.

$$Q_{i,s} = sQ_i \qquad \text{Eq. 2}$$

$$y_i = r_i s^{-1} \bmod n, r_i \xleftarrow{R} Z_n^* \qquad \text{Eq. 3}$$

Eqs. 2 and 3 are merely illustrative, and the present disclosure is not limited thereto.

Figure 7:
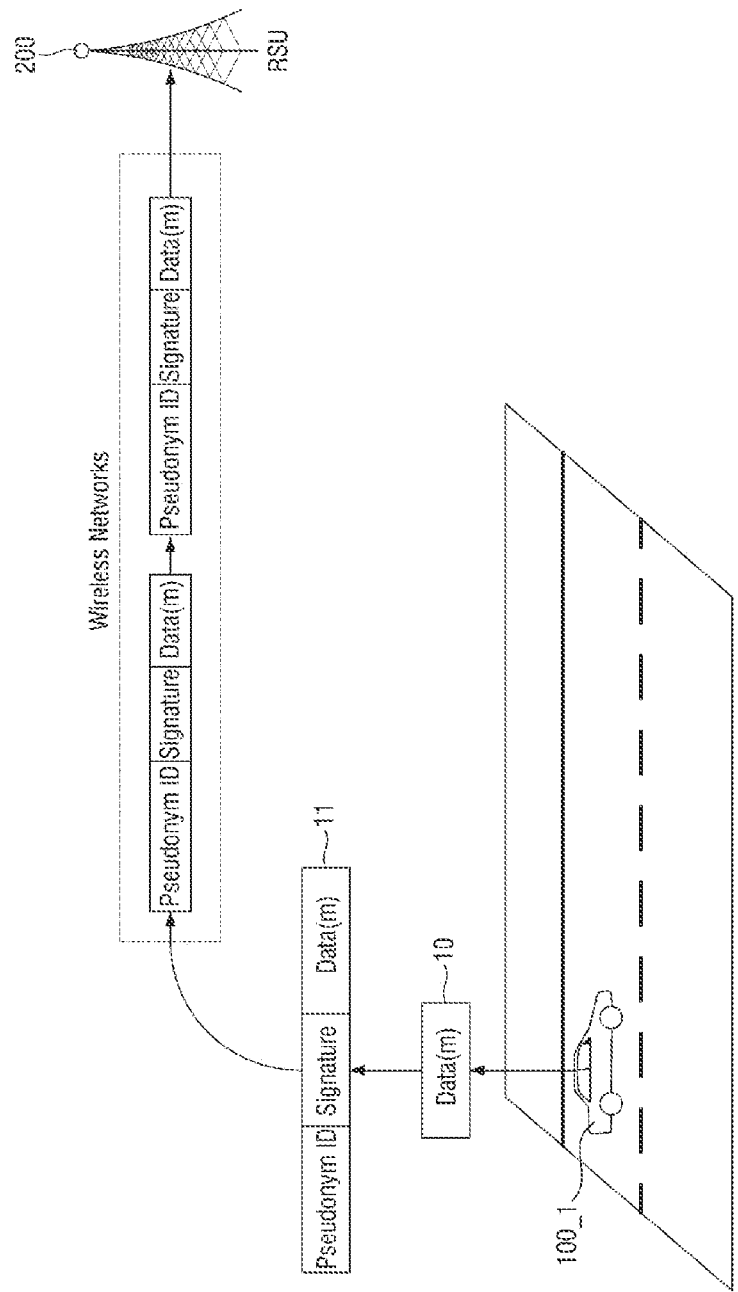
FIG. 7 is a diagram explaining steps S200 and S300 of FIG. 3.

FIG. 7 is a diagram explaining steps S200 and S300 of FIG. 3.

Referring to FIG. 7, the vehicle 100_1 generates the pseudonym ID ($PID_i$) and a signature ($sign_i(m)$) corresponding to the public key ($Q_i$) (step S200). Referring further to FIG. 7, the vehicle data (m) may be vehicle data (m) 10 acquired through the sensor 130 and may correspond to a message for the service provider 400.

To obtain an arbitrary point (a, b) satisfying point (a, b)=kG on the elliptic curve, the security module 110 may select k in the set of integers $Zn^* = \{1, 2, \ldots, n-1\}$ as represented in Eq. 4, and may designate "a" as a variable v as represented in Eq. 6 below.

At time t, the security module 110 may calculate as represented in Eq. 5 below by using a second random value ($r_j$), $y_i$ and the public key ($Q_{i,s}$) through the arithmetic unit 140 to generate the pseudonym ID ($PID_i$).

At time t, an operation may be performed by using a hash function $h(m\|t)$ for the vehicle data (m), the second random value ($r_j$), $y_i$, the private key ($x_i$) and the variables v and k to generate the signature ($sign_i(m)$) as represented in Eq. 7 below (in the following, ‖ represents that data is linked and an operation between data is unnecessary). The hash function may include a cryptographic hash function (SHA256), and the present disclosure is not limited thereto when outputting a certain size of data.

$$r_j, k \xleftarrow{R} Z_n^* \qquad \text{Eq. 4}$$

$$PID_i = r_j \cdot y_i \cdot Qi, s = r_j \cdot r_i \cdot s^{-1} sQi = r_j \cdot r_i Qi \qquad \text{Eq. 5}$$

$$(a,b) = kG, v = a \qquad \text{Eq. 6}$$

$$sign_i(m) = (h(m\|t) + r_j \cdot r_i \cdot x_i \cdot v) \cdot k^{-1} \bmod n \qquad \text{Eq. 7}$$

Eqs. 4 to 7 are merely illustrative, and the present disclosure is not limited thereto.

Referring to FIG. 7, the vehicle 100_1, which is one of the vehicles 100, transmits the pseudonym ID ($PID_i$), the signature ($sign_i(m)$), and vehicle data (m) to the RSU 200 (step S300). For example, the wireless communication module 120 may transmit a data set 11 to the wireless module 210 of the RSU in a form of $PID_i \| m \| sign_i(m) \| v \| t$.

Figure 8:
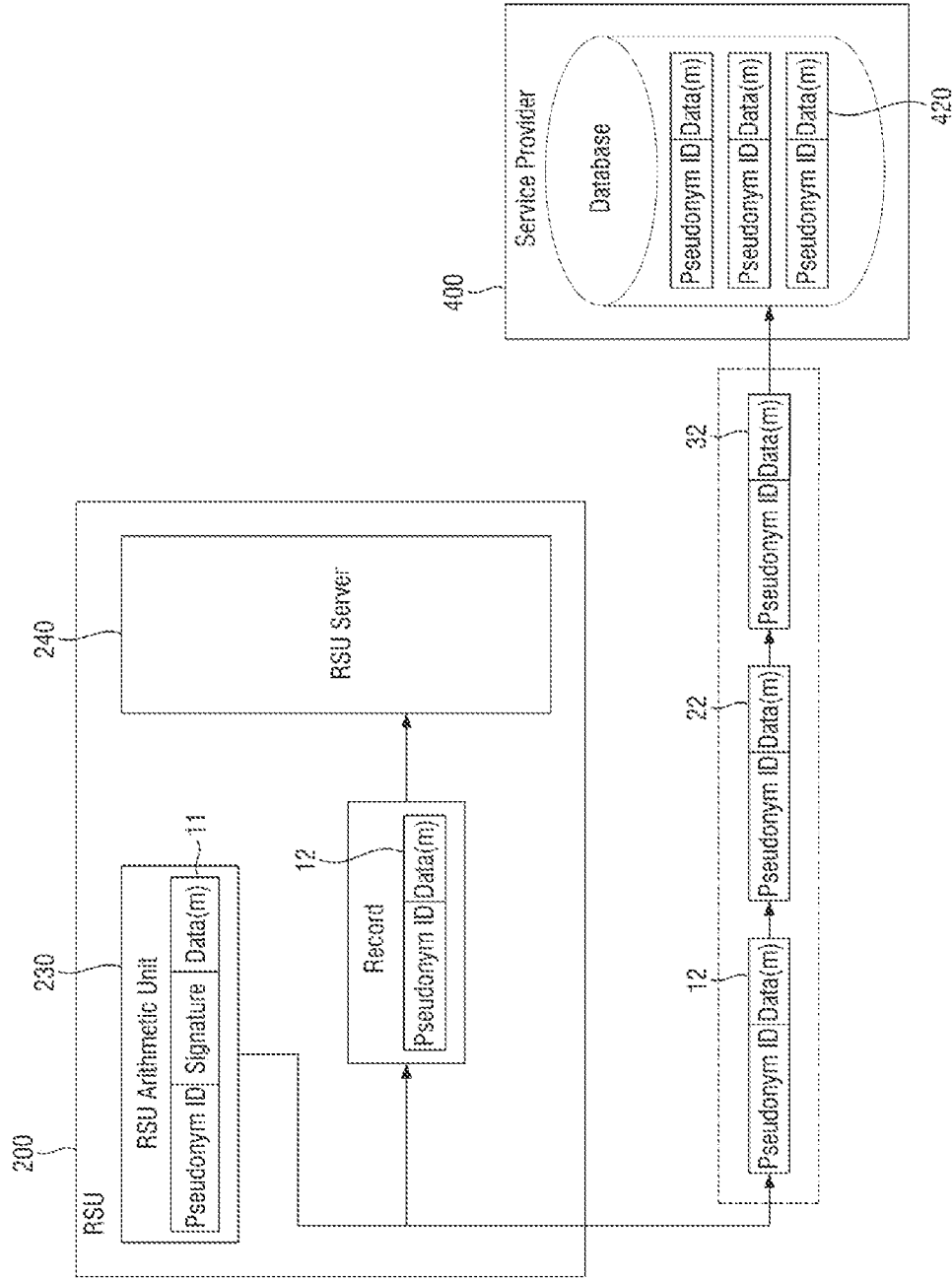
FIG. 8 is a diagram explaining steps S400 and S500 of FIG. 3.

FIG. 8 is a diagram explaining steps S400 and S500 of FIG. 3. Referring to FIG. 8, the RSU 200 determines whether the vehicle 100 has been registered with the service provider 400 or not based on the pseudonym ID (PIDi) (step S400).

The RSU arithmetic unit 230 of the RSU 200 may generate a modular inverse w of the signature ($sign_i(m)$), a variable u1, and a variable u2 as represented in Eqs. 8 to 10, respectively, by using the pseudonym ID ($PID_i$), the vehicle data (m), the signature ($sign_i(m)$), the variable v, and the time t received at the RSU at the transmission step S300. As a result, a point (x', y') may be generated by using the variable u1, the variable u2, the pseudonym ID ($PID_i$), the point G predetermined on the elliptic curve and the initial secret value (s) stored in the RSU server 240, as represented in Eq. 11 below.

The point (x', y') may be equal to kG as represented in Eq. 11 below, and the variable v and x' generated as the x-coordinate may coincide in a case where the data set 11 of $PID_i \| m \| sign_i(m) \| v \| t$ received at the transmission step S300 has been generated based on the initial secret value (s) provided by the service provider 400.

As represented in Eq. 12 below, verifying whether x' calculated by the RSU arithmetic unit 230 is possible and the received variable v coincide or not. Therefore, verifying whether the vehicle 100 has been registered for the service provided by the service provider 400 or not through the step is possible.

$$w = sign_i(m)^{-1} \bmod n \qquad \text{Eq. 8}$$

$$u_1 = w \cdot h(m\|t) \bmod n \qquad \text{Eq. 9}$$

$$u_2 = w \cdot v \cdot s^{-1} \bmod n \qquad \text{Eq. 10}$$

$$(x', y') = u_1 G + u_2 PID_i = \qquad \text{Eq. 11}$$
$$w \cdot (h(m\|t) + r_j \cdot r_i \cdot x_i \cdot v \cdot s)G = sign_i(m) \cdot (h(m\|t) + r_j \cdot r_i \cdot x_i \cdot v \cdot s)G =$$
$$k \cdot (h(m\|t) + r_j \cdot r_i \cdot x_i \cdot v \cdot s)^{-1} \cdot (h(m\|t) + r_j \cdot r_i \cdot x_i \cdot v \cdot s)G = kG$$

$$v? = x' \qquad \text{Eq. 12}$$

Eqs. 8 to 12 are merely illustrative, and the present disclosure is not limited thereto.

Further referring to FIG. 8, if YES is determined in the verification step S400, the RSU 200 transmits the pseudonym ID ($PID_i$) and the vehicle data (m) to the database 420 of the service provider 400 and the RSU server 240 (step S500). If NO is determined in the verification step S400, the communication method, according to some embodiments, may be ended.

The data set 11 having passed the verification step S400 may be configured as a record rcd of $PID \| m \| sign(m) \| t$ to be stored and transmitted to the service provider 400. Further, the RSU generates a signature with its own public key in record sets 12, 22 and 32 (record set=rcd_1‖rcd_2‖ . . . ‖rcd_n) of the records rcd received for a certain period of time, so that a blockchain transaction trans in a form of $RSU \| ECDSA_{Sign}$ (Pri, record)‖record‖t may be generated to be transmitted to one of the RSUs 200 which generates a blockchain. A public key based authentication technique such as the ECDSA, the RSA, or the like, may be adopted for the signature of the RSU.

Figure 9:
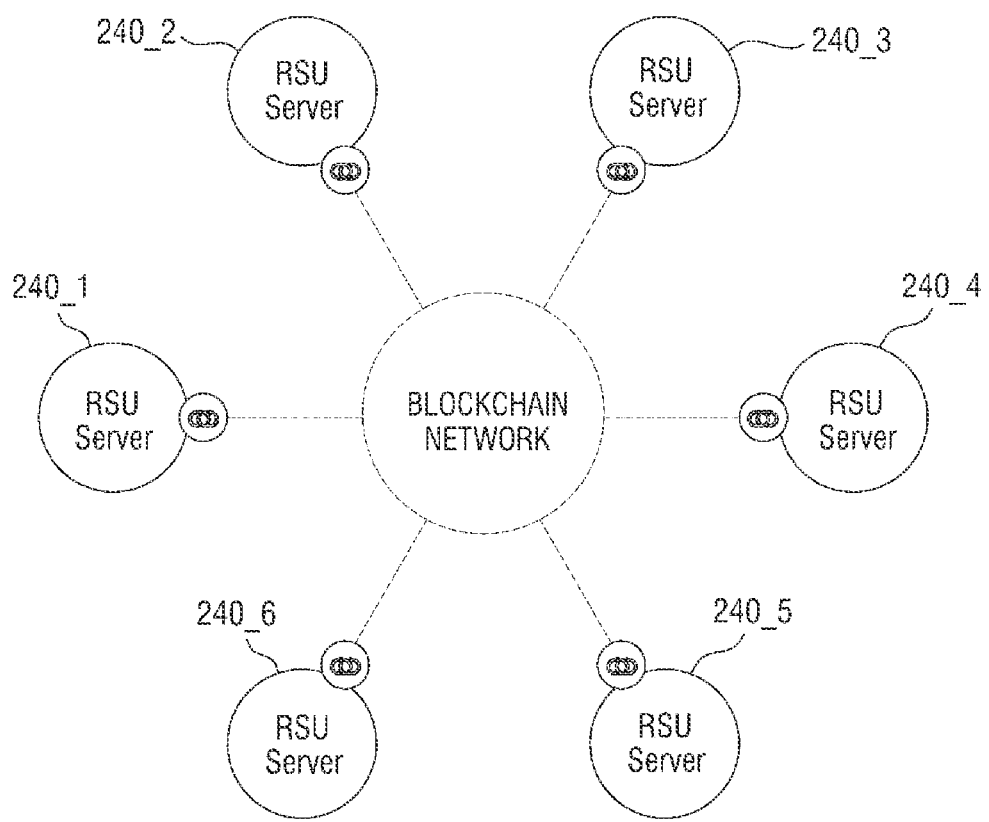
FIGS. 9 to 11 are diagrams explaining a data storage method used in the communication method according to some embodiments.
Figure 10:
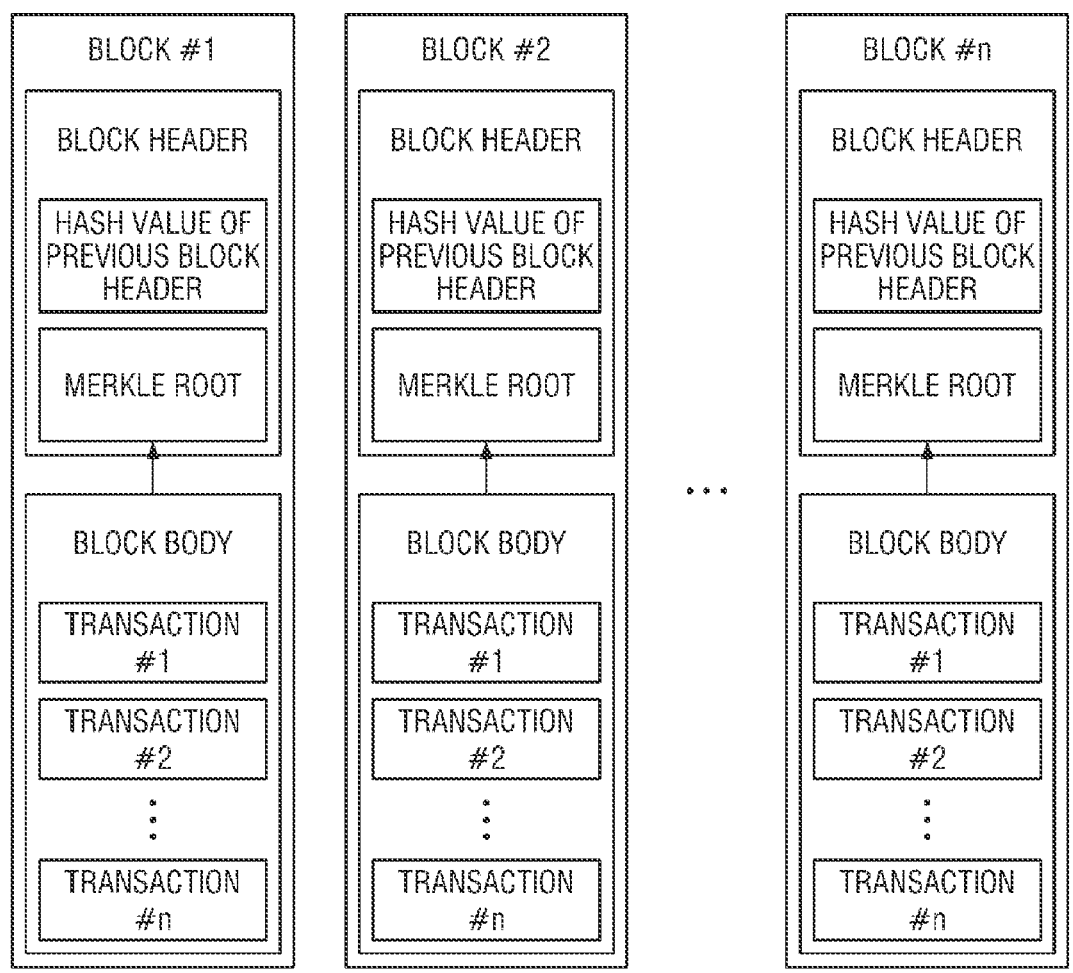
Figure 11:
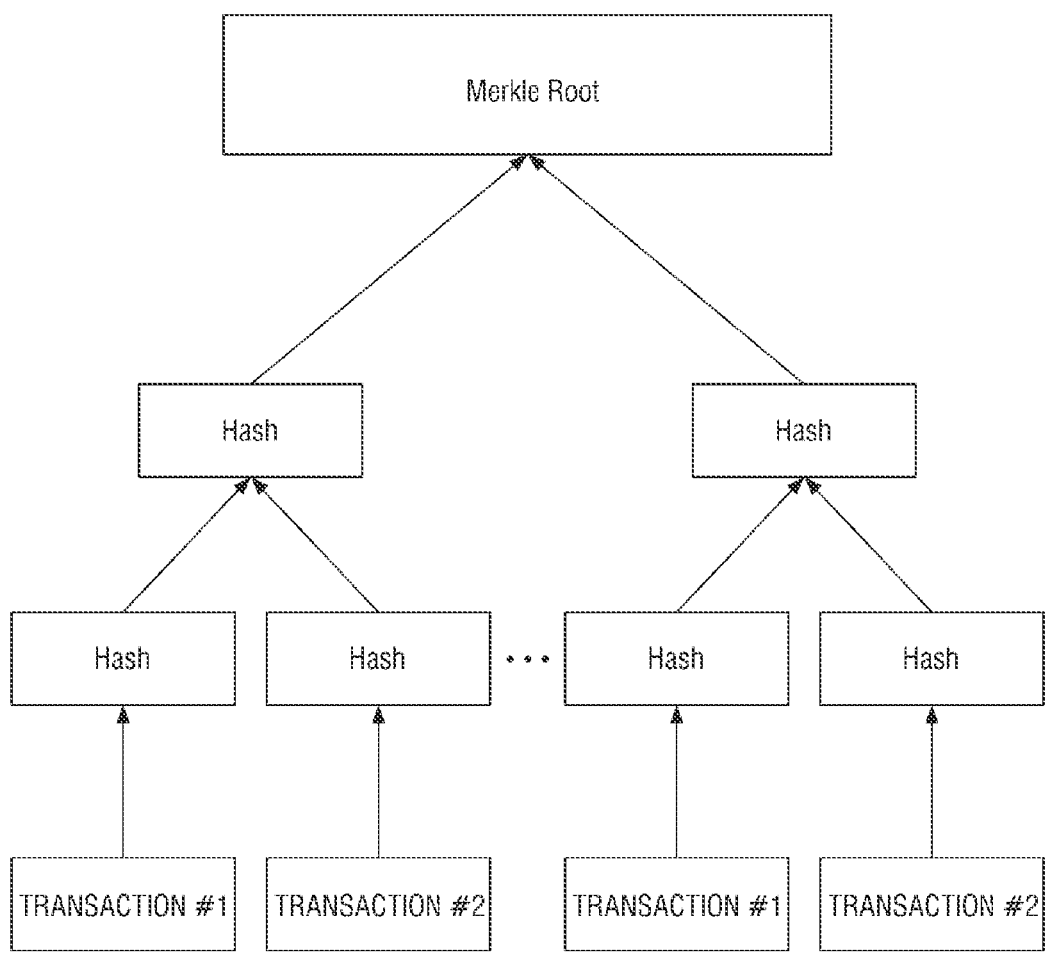

Referring to FIGS. 9 to 11, after the transmission step S500, the plurality of RSU servers 240_1 to 240_6 as blockchain nodes may form a blockchain network. The RSU servers 240_1 to 240_6 forming a blockchain-based system manage blocks in a chain-shaped data structure as shown in FIG. 10. Additionally or alternatively, the data in the blockchain may be kept equally at each blockchain node without the control of a central system.

Here, a hash value of the previous block is recorded in each block to refer to the previous block by using the hash value. The header of each block may include a merkle root as shown in FIG. 10, and the block body may store data forming a merkle tree. In such a data structure, as the blocks are stacked, a forgery/alteration on the data recorded in the blocks become more difficult. Therefore, the integrity and reliability of the data can be guaranteed even in a distributed environment.

The data stored in the blockchain is data maintained by the RSU servers 240_1 to 240_6 forming the blockchain network, and one or more blocks recording the data are formed in the chain-shaped data structure. When the data is recorded in each block in a form of a transaction (e.g., transactions #1 to #n), the blockchain data may be used as a distributed ledger. However, the form of data recorded in each block may vary. The formation of the blockchain network is an example of a method for storing data having passed the verification of the present disclosure, and the present disclosure is not limited thereto.

Figure 12:
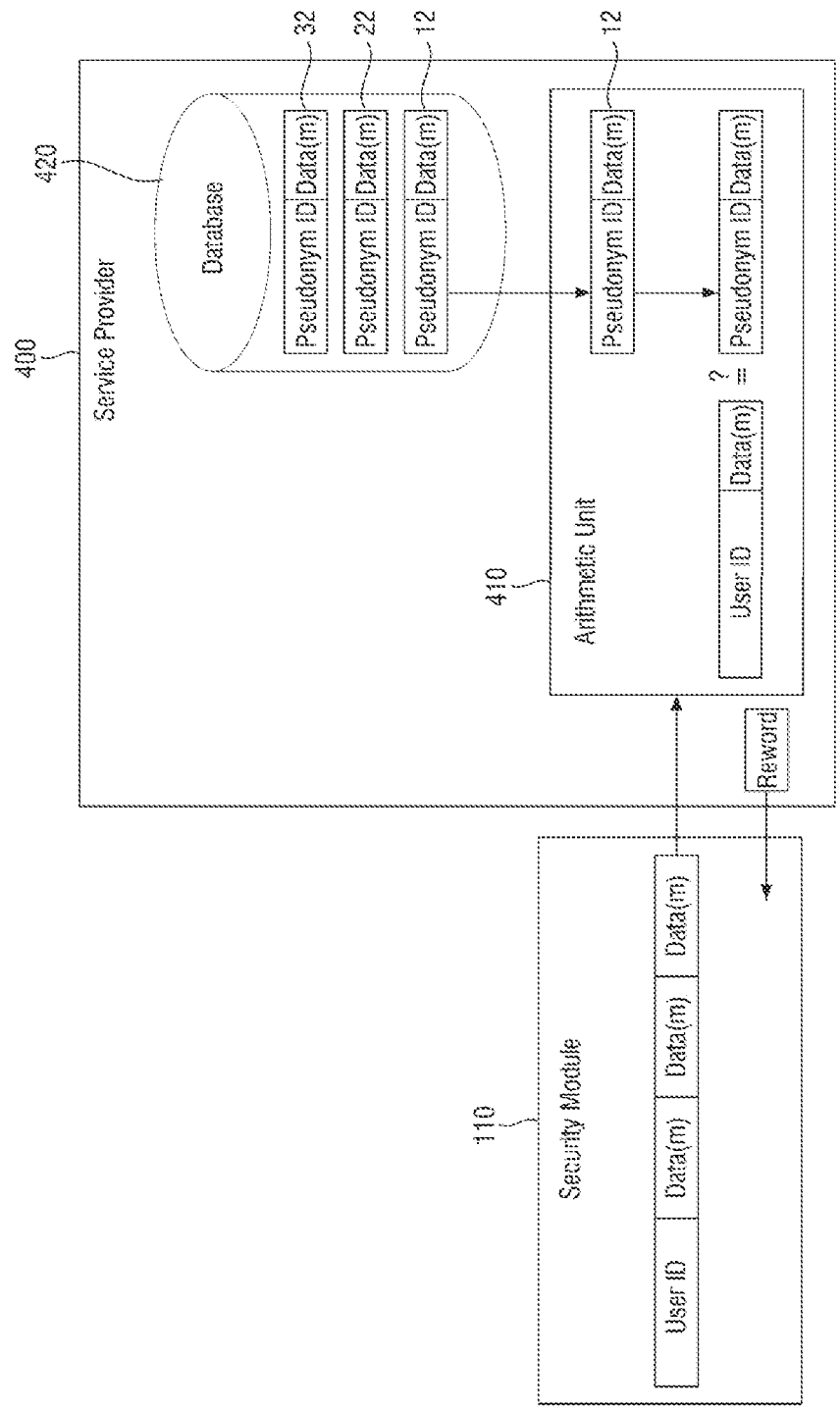
FIG. 12 is a diagram explaining steps S600 and S700 of FIG. 3.

FIG. 12 is a diagram explaining steps S600 and S700 of FIG. 3. Referring to FIG. 12, the vehicle 100 requests a reward for the message provided to the service provider 400 through the RSU 200 (step S600).

The vehicle 100 may transmit the user ID (ID$_i$) with transmitted n data sets (m$_1$, r$_1$, t$_1$) . . . (m$_n$, r$_n$, t$_n$) (n is an arbitrary number independent of the point G on the elliptic curve) to the service provider 400 through the wireless communication module 120. According to some embodiments, the vehicle 100 may transmit the user ID (ID$_i$) without the data sets.

The service provider 400 rewards the vehicle 100 based on the data stored in the database 420 (step S700). The service provider 400 retrieves a user ID (ID$_i$), which is the same as the received user ID (ID$_i$) and is stored at the registration step S100, to find ID$_i$∥r$_i$∥Q$_i$ stored in the database at the time of user registration. As a result, the public key (Q$_i$) and the first random value (r$_i$) may be checked.

In the reward step of the communication method, according to some embodiments, the service provider 400 performs Algorithm 1 (below) to search for a record rcd with a time (t$_k$) which is the same as a time (t$_j$) (t$_k$=t$_j$). The reward (R) is provided when the received vehicle data (m) matches vehicle data (m$_k$) in the record rcd of PID$_k$∥m$_k$∥sign (m$_k$)∥t$_k$ stored in the database 420, and the public key (Q$_i$) generated by using the received second random value (r$_j$), and the first random value (r$_i$) and the pseudonym ID (PID$_k$) stored in the database 420 matches the public key (Q$_i$) stored in the database 420. However, the present disclosure is not limited to the reward step described above.

---

< Algorithm 1 >

---

Search ID$_i$∥r$_i$∥Q$_i$ (ID$_i$=ID$_i$')
Computes on m$_j$∥r$_j$∥t$_j$ (1≤j≤n)
1   Reward R=0
2   From j = 1 to j = n
3      Search rcd corresponding to t$_k$=t$_j$
4      If find rcd = PID$_k$∥m$_k$∥sign(m$_k$)∥t$_k$
5         satisfying m$_k$=m$_j$
6         then if Q$_i$=r$_j^{-1}$·r$_i^{-1}$·PID$_k$
7           then R++
8      j++
9   Return R
Compensates for R

---

In the communication method according to some embodiments, the user ID (ID$_i$) may be transmitted without the vehicle data (m) of the vehicle 100 and the user may be rewarded based on the vehicle data (m) stored in the database 420 which corresponds to the user ID (ID$_i$).

In the communication method according to some embodiments, the vehicle 100 is registered by using the public key obtained through the ECC operation without exposing the private key (x$_i$) of the security module 110 to the outside. As a result, embodiments of the present disclosure verify whether the vehicle 100 has been registered for the service or not based on the pseudonym ID (PID$_i$) generated by using the first and second random values, so that the user's vehicle 100 can be identified while ensuring the anonymity thereof.

In the communication method according to some embodiments, when the RSU server 240 forms the blockchain network for storing the vehicle data (m), the RSU server 240 maintains the vehicle data (m) received from the vehicle 100 in the blockchain so that the service provider 400 cannot refuse a reward by denying the vehicle data (m). Therefore, the user can be rewarded according to the vehicle data (m) provided to the service provider 400.

However, the effects of the embodiments are not restricted to the one set forth herein. The above and other effects of the embodiments will become more apparent to one of daily skill in the art to which the present disclosure pertains by referencing the claims.

What is claimed is:

1. A communication method performed by a vehicle, the method comprising:
   registering a first public key for the vehicle with a service provider to receive a service;
   receiving a second public key and a first value from the service provider, the second public key being generated based on the first public key;
   generating a pseudonym ID of the vehicle using the first value and the second public key, wherein the pseudonym ID is generated based on a random value of the vehicle, and wherein the generation of the pseudonym ID further comprises:
   generating a private key for the vehicle;
   generating a signature for the vehicle data using the private key, the random value and the first value; and
   transmitting the signature to a base station; and
   transmitting the pseudonym ID and the vehicle data of the vehicle to the base station for a verification indicating whether the vehicle being registered in the service of the service provider.

2. The method of claim 1, further comprising:
   in response to the verification being passed,
   transmitting a user ID of the vehicle to the service provider for requesting a reward; and
   receiving the reward from the service provider.

3. The method of claim 1, further comprising:
   generating a private key for the vehicle; and
   generating the first public key using the private key.

4. The method of claim 3, wherein the first public key is generated based on the private key and an elliptic curve cryptography.

5. The method of claim 1, wherein the second public key is generated based on the first public key and an initial secret value of the service provider.

6. The method of claim 5, wherein the first value is generated based on a random value of the service provider and the initial secret value of the service provider.

7. The method of claim 1, wherein the base station includes a roadside unit (RSU) configured for wireless communication with the vehicle.

8. The method of claim 1, wherein a first pseudonym ID generated at a first time point among a plurality of pseudonym IDs is different from a second pseudonym ID generated at a second time point different from the first time point among the pseudonym IDs.

9. A communication method performed by a base station, the method comprising:
   receiving an initial secret value from a service provider providing a service to a vehicle;

receiving a pseudonym ID, a vehicle data, and a signature for the vehicle data from the vehicle, wherein the pseudonym ID is generated based on a first value, a second public key, and a random value of the vehicle, wherein the second public key is generated by the service provider based on the initial secret value and a first public key used by the vehicle to register the vehicle with the service provider to receive a service, wherein the first value and the second public key are received by the vehicle from the service provider in response to registering the vehicle, and wherein the generation of the pseudonym ID further comprises:
  generating a private key for the vehicle;
  generating the signature for the vehicle data using the private key, the random value, and the first value; and
  transmitting the signature to the base station;
verifying whether the vehicle is registered with the service provider based on the transmitted pseudonym ID, the signature, and the initial secret value; and
transmitting a first transaction including the pseudonym ID and the vehicle data to the service provider in response to the verification being passed.

10. The method of claim 9, wherein the base station includes a first base station and a second base station, and
  a first base station server of the first base station shares the first transaction and a database with a second base station server of the second base station different from the first base station.

11. The method of claim 10, wherein the first and second base station servers comprise nodes of a blockchain network.

12. The method of claim 9, wherein the verifying comprises verifying based on an elliptic curve digital signature algorithm.

13. The method of claim 9, wherein the pseudonym ID is generated based on a generated random number of the vehicle and a public key, and
  the public key is generated based on the initial secret value.

14. The method of claim 13, wherein the pseudonym ID is generated further based on a first value generated by the service provider.

15. The method of claim 14, wherein the signature for the vehicle data is generated based on a private key of the vehicle, the random number of the vehicle and the first value.

16. The method of claim 9, wherein the base station includes a roadside unit (RSU) configured for wireless communication with the vehicle.

17. A communication method performed by a service provider providing a service to a vehicle, the method comprising:
  transmitting an initial secret value to a base station configured for wireless communication with a vehicle;
  receiving a first public key for the vehicle from the vehicle to register the vehicle to receive the service;
  generating a second public key based on the first public key and the initial secret value;
  generating a first value based on a random value and the initial secret value;
  transmitting the second public key and the first value to the vehicle; and
  receiving a first transaction including a pseudonym ID and a vehicle data of the vehicle from the base station in response to a verification performed by the base station being passed,
  wherein the verification indicates whether the vehicle is registered in the service of the service provider, and wherein the pseudonym ID is generated by:
    generating, by the vehicle, a private key for the vehicle;
    generating, by the vehicle, the signature for the vehicle data using the private key, a random value, and the first value; and
    transmitting, by the vehicle, the signature to the base station.

18. The method of claim 17, further comprising:
in response to the verification being passed,
receiving a user ID of the vehicle from the vehicle, and transmitting a reward to the vehicle based on the user ID.

* * * * *